(12) United States Patent
Buil et al.

(10) Patent No.: US 10,993,524 B2
(45) Date of Patent: May 4, 2021

(54) SYSTEM AND METHOD FOR TRACKING AN ORAL CARE DEVICE

(71) Applicant: KONINKLIJKE PHILIPS N.V., Eindhoven (NL)

(72) Inventors: Vincentius Paulus Buil, Veldhoven (NL); Lucas Jacobus Franciscus Geurts, Best (NL); Frederik Jan De Bruijn, Eindhoven (NL); Karl Catharina Van Bree, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 219 days.

(21) Appl. No.: 16/061,808

(22) PCT Filed: Dec. 14, 2016

(86) PCT No.: PCT/EP2016/081029
§ 371 (c)(1),
(2) Date: Jun. 13, 2018

(87) PCT Pub. No.: WO2017/102859
PCT Pub. Date: Jun. 22, 2017

(65) Prior Publication Data
US 2018/0368567 A1    Dec. 27, 2018

Related U.S. Application Data

(60) Provisional application No. 62/267,334, filed on Dec. 15, 2015.

(51) Int. Cl.
*A46B 15/00* (2006.01)
(52) U.S. Cl.
CPC ...... *A46B 15/0044* (2013.01); *A46B 15/0036* (2013.01); *A46B 2200/1066* (2013.01)

(58) Field of Classification Search
CPC . A61C 9/004; A46B 15/0044; A46B 15/0004; A46B 15/0036
See application file for complete search history.

(56) References Cited

U.S. PATENT DOCUMENTS

| 8,744,192 B2 * | 6/2014 | Ortins | A46B 15/0008 |
| | | | 382/195 |
| 2009/0215015 A1 * | 8/2009 | Chu | G09B 19/0084 |
| | | | 434/238 |

FOREIGN PATENT DOCUMENTS

| EP | 2384720 A2 | 11/2011 |
| WO | 2010059484 A1 | 5/2010 |

(Continued)

OTHER PUBLICATIONS

Chang et al: "Playful Toothbrush: Ubicomp Technology for Teaching Tooth Brushing to Kingergarten Children"; CHI 2008, Apr. 5-10, 2008, Florence, Italy, 10 Page Document.

(Continued)

*Primary Examiner* — Laura C Guidotti

(57) ABSTRACT

A method and system for monitoring the location of an oral care device (102) within the mouth of a user, includes: an oral care device (102) having a light source (104); an optical sensor (112) configured to receive light emitted by the light source and to receive light reflected from a user using the oral care device; a computing device (110) adapted to receive and process signals generated by the optical sensor, and programmed to: detect at least one facial feature of the user from the received light reflected from a user; estimate the location of the user's teeth according to the detected facial feature; determine a location of the light source according to the received emitted light; compare the location of the light source to the location of the teeth to estimate the position of the oral care device with respect to the teeth of the user.

13 Claims, 3 Drawing Sheets

(56) References Cited

FOREIGN PATENT DOCUMENTS

| WO | 2010134050 A1 | 11/2010 |
| WO | 2011077282 A1 | 6/2011 |
| WO | 2012005888 A1 | 1/2012 |
| WO | 2013001462 A2 | 1/2013 |
| WO | 2014202438 A1 | 12/2014 |

OTHER PUBLICATIONS

Olie et al: "Mathematical Modelling of Tooth Demineralisation and PH Profiles in Dental Plaque"; Jounral of Theoretical Biology 309 (2012), pp. 159-175.
Kolibree-Advertisement for Augumented Toothbrush-Originally Downloaded in 2015 At http://www.kolibree.com/en/product.

* cited by examiner

SYSTEM AND METHOD FOR TRACKING AN ORAL CARE DEVICE

CROSS-REFERENCE TO PRIOR APPLICATIONS

This application is the U.S. National Phase application under 35 U.S.C. § 371 of International Application No. PCT/EP2016/081029, filed on Dec. 14, 2016, which claims the benefit of U.S. Provisional Patent Application No. 62/267,334 filed on Dec. 15, 2015. These applications are hereby incorporated by reference herein.

FIELD OF THE INVENTION

The present disclosure is directed generally to methods and systems for tracking the location of an oral care device within the mouth of a user.

BACKGROUND

Various forms of tracking the location of an oral care device within a user's mouth have been attempted. Tracking the location of the oral care device allows for effective feedback to a user with respect to the user's oral hygiene practices. For example, if the location of a brush head is tracked within the user's mouth, portions of teeth not yet cleaned may be identified so that the user can focus on those areas.

However, known attempts to track the location of a brush within the user's mouth have disadvantages. For example, video-based tracking devices are designed to track the handle of a brush in relation to the tracked face. The localization of the brush tip inside the mouth is then based on extrapolation, which can be a cause of inaccuracy. Moreover, occlusion by the device operating hand challenges the robustness of this method.

As another example, locally generated static magnetic fields have been used to determine position and orientation in relation to a user's head. The user needs to wear ear plugs that sense of the appliance position and orientation in relation to the ear plugs. Inserting earbuds for appliance tracking is acceptable for infrequent tasks, but is likely unaccepted every time you brush your teeth.

As a further example, accelerometers and/or gyroscopes can determine orientation of the toothbrush in relation to gravity field, and relative orientation on other axes. Accelerometers and gyroscopes, however, cannot provide exact information on where the user is brushing in the mouth, since the reference to the teeth is missing.

Accordingly, there is a need in the art for improved systems and methods for tracking the location of an oral care device within the mouth of a user.

SUMMARY OF THE INVENTION

The present disclosure is directed to inventive methods and systems for accurately tracking the location of an oral care device within the mouth of a user. Various embodiments and implementations herein are directed to a system that includes an oral care device having one or more light sources configured to emit light from a portion of the oral care device. A computing device, including a processor and a non-transitory storage medium for storing program code, is programmed to track a user's face and the location of the oral care device according to the light emitted by the light source. The computing device is further configured to estimate the location of the user's teeth, and to compare the location of the light source with the estimated location of the oral care device, to determine which teeth are currently being cleaned. The system may also be configured to determine the orientation of the oral care device within the mouth of the user, to determine which side of the teeth are currently being cleaned. The system may include a dedicated application for showing a user which teeth have been cleaned and which teeth may still require cleaning.

Generally, in one aspect, a system for monitoring the location of an oral care device within the mouth of a user, comprises: an oral care device having a light source; an optical sensor configured to receive light emitted by the light source and to receive light reflected from a user using the oral care device; a computing device adapted to receive and process signals generated by the optical sensor, and programmed to: detect at least one facial feature of the user from the received light reflected from a user; estimate the location of the user's teeth according to the detected facial feature; determine a location of the light source according to the received emitted light; compare the location of the light source to the location of the teeth to estimate the position of the oral care device with respect to the teeth of the user.

According to an embodiment, the system may further comprise a graphical interface programmed to display which teeth have been cleaned, based on the time spent by the oral care device at each position within the oral cavity.

According to an embodiment, the computing device is further programmed to: determine an orientation of the oral care device according to a measurement; and determine the side of the teeth currently being cleaned based on the orientation of the oral care device.

According to an embodiment, the measurement is one of: a relative intensity of the received light emitted by the light source (106), or a size of a pattern of the received light emitted by the light source (106).

According to an embodiment, the measurement is determined from a signal received from a sensor located within the oral care device, wherein the sensor is one of: a gyroscope, a magnetometer, or an accelerometer.

According to an embodiment, the oral care device further includes a second light source, wherein the first light source emits light having a first characteristic in a first direction relative to the oral care device, and the second light source emits light having a second characteristic in a second direction relative to the oral care device.

According to an embodiment, the computing device is further programmed to: determine an orientation of the oral care device by comparing an intensity of the light received from the first light source, and identified by the first characteristic, with an intensity of the light received from the second light source, and identified by the second characteristic; and determine the side of the teeth currently being cleaned based on the orientation of the oral care device.

According to an embodiment, the first characteristic is a first frequency and the second characteristic is a second frequency.

According to an embodiment, the first characteristic is a first code, modulated with a first modulation scheme, and the second characteristic is a second code, modulated with a second modulation scheme.

According to an embodiment, the oral care device further comprises an indicator light source configured to emit light having at least a first characteristic, wherein the mode of light transmitted corresponds to the value of a measurement.

According to an embodiment, the measurement is one of: a force applied to the oral care device, a movement speed of the oral care device, or a time spent by the oral care device at a position with respect to the user's teeth, wherein the characteristic is one of: a frequency, a color, or an embedded code.

According to an embodiment, the computing device is further programmed to generate a model of the user's teeth according to the time spent at each position within the oral cavity during at least one cleaning session.

According to an embodiment, the computing device is further programmed to interpolate the position of the oral care device when optical sensor ceases receiving light emitted by the light source.

According to another aspect, a method for determining the location of an oral care device within a user's mouth, comprises the steps of: receiving a signal from an optical sensor; identifying, from the signal, the location of a light source located on an oral care device; identifying, from the signal, at least one feature of a user's face, captured by the optical sensor; estimating the location of the user's teeth according to the identified facial feature; comparing the location of the light source with the estimated location of the user's teeth to determine the position of an oral care device with respect to the teeth.

According to an embodiment, the method further comprises the steps of: determining the orientation of the oral care device according to a first measurement; and determining the side of the teeth currently being cleaned based on the orientation of the oral care device.

In various implementations herein, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers. In addition, the "program" or "computer code" is to be understood as being stored on a non-transitory, computer readable medium.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

These and other aspects of the invention will be apparent from and elucidated with reference to the embodiment(s) described hereinafter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION OF EMBODIMENTS

The present disclosure is directed to inventive methods and systems for accurately tracking the location of an oral care device within the mouth of a user. More generally, Applicant has recognized and appreciated that it would be beneficial to track the location of oral care device by monitoring a light transmitting through the cheek of a user. Various embodiments and implementations herein are directed to a system that includes an oral care device having one or more light sources configured to emit light from a portion of the oral care device. A computing device, including a processor and a non-transitory storage medium for storing program code, is programmed to track a user's face and the location of the oral care device according to the light emitted by the light source. The computing device is further configured to estimate the location of the user's teeth, and to compare the location of the light source with the estimated location of the oral care device, to determine which teeth are currently being cleaned. The system may also be configured to determine the orientation of the oral care device within the mouth of the user, to determine which side of the teeth are currently being cleaned. The inventive system may include a dedicated application for showing a user which teeth have been cleaned and which teeth may still require cleaning.

Although the methods and systems described below are applied to oral care devices, it should be understood that the system and method may also apply to tracking other personal care devices, such as shavers, trimmers, facial cleansers, hair dryers, or to any other device which may be beneficially tracked with respect to a user's face.

Figure 1:
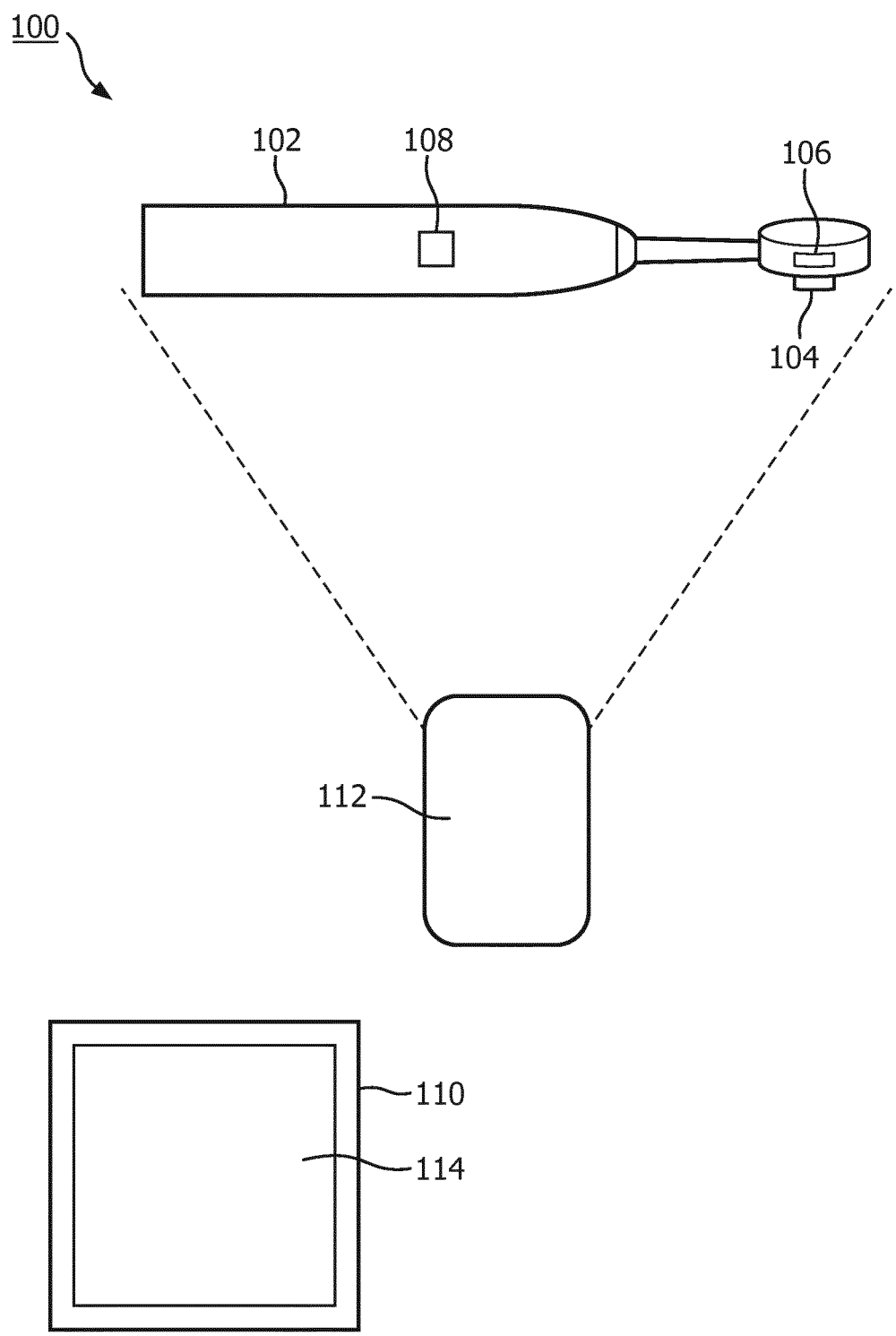
FIG. 1 is a schematic representation of a system for tracking an oral care device according to an embodiment.

Referring to FIG. 1, in one embodiment, is a representation of a system 100 for tracking an oral care device within the mouth of a user. System 100 may comprise an oral care device 102 such as a toothbrush, oral irrigator, or other device, having at least one light source 104 located near or on the tip of oral care device 102. Note that the light source 104 only needs to be located at position of the oral care device such that it will enter a user's oral cavity during use. The light source 104 may be configured to emit visible light or it may emit light outside of the visible spectrum, such as infrared light. In an embodiment, light source 104 is located on the side of the oral care device opposite the operable side. For example, if the oral care device is a toothbrush, the light source may be located on the side opposite the bristles. To avoid putting an expensive light source in a disposable brush head (or the equivalent on a different oral care device), the light source may be placed in the handle of the oral care device, and each replaceable head may have optical fiber for conducting the light from within the handle to a point where it may be emitted from the head of oral care device 102. In an alternate embodiment, the light may be also be emitted from the operable side of oral care device 102, such as from the bristles of a toothbrush.

In an embodiment, the oral care device 102 may have at least one other light source 106, configured to emit light in a different direction (radially from oral care device 102) from light source 104. For example, light source 106 may be placed on the side of oral care device 102, such that it emits light at approximately a 90 degree angle with respect to the light emitted by light source 104. Light source 104 and light source 106 may further emit light of different frequencies (i.e. light source 104 may emit light with a first frequency while light source 106 emits light with a second frequency), or modulated with different codes (i.e. light source 104 may transmit light embedded with a first code, while light source 106 may transmit light embedded with a second code). In an embodiment, oral care device 102 may include a microchip or other computing device sufficient for modulating the light emitted by light source 104 and light source 106 with differing codes, or to cause light source 104 and light source 106 to emit light of different frequencies. Furthermore, oral care device 102 may include a sensor 108, such as an accelerometer or a gyroscope.

System 100 may further comprise a computing device 110, which may include a processor and a non-transitory storage medium, containing program code to cause the processor to execute an algorithm in accordance with the various embodiments described herein. Computing device 110 may be a general purpose computer, a mobile device, a custom dedicated computing device, or any other computing device capable of storing and executing the program described herein. Computing device 110 may be configured with a face tracking algorithm, as are known in the art. Computing device 110 may be operable connected to at least one optical sensor 112, such as a camera, that is capable of detecting the light emitted by light source 104, and light reflected from the face of a user of sufficient resolution that a facial tracker may be able to locate and track a face. Optical sensor 112 may be a standard CMOS camera, or may be a camera embedded on a mobile device. Optical sensor 112 may also comprise a plurality of optical sensors. For example, one optical sensor may be configured to receive infrared light emitted by light source 104 while another is configured to view a user's face.

Where computing device 110 is a mobile device, the program operated by computing device 110 may be a mobile application, which may also be configured to display a graphical interface 114 of a model of a user's teeth. Where computing device 110 is a device apart from a mobile device, computing device 110 may cooperate with a mobile application or with another application, for displaying a model of the user's teeth. Alternatively, computing device 110 may be associated with a display (apart from a mobile device) for displaying the model of the user's teeth.

Computing device 110 and optical sensor 112 may be associated with a mirror, such as a "smart mirror" where a user could view their face while using oral care device 102. For example, a smart mirror may comprise a display behind a half-translucent mirror.

Figure 2A:
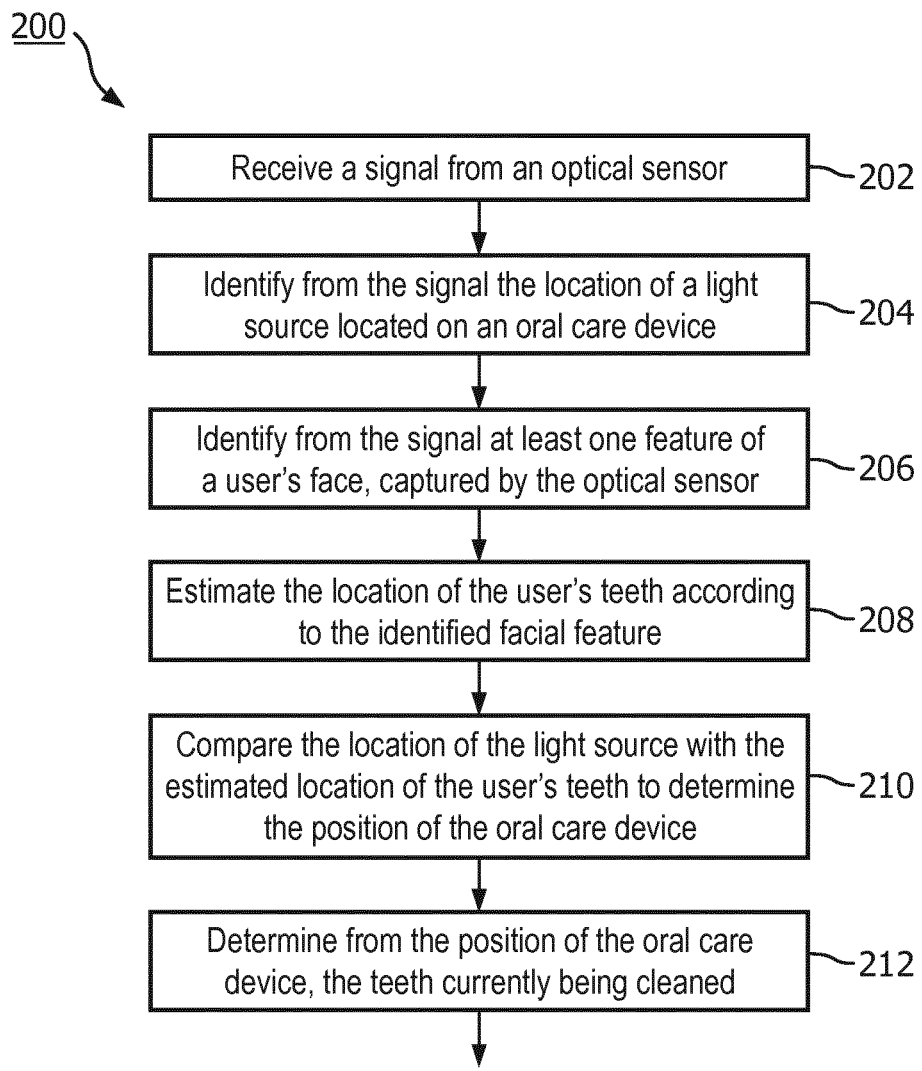
FIG. 2A is a flowchart of a method for tracking an oral care device in accordance with an embodiment.

Referring to FIG. 2A, there is shown a flow chart of a method 200 for tracking the location of an oral care device within the oral cavity of a user. The method utilizes one or more embodiments of the systems described or otherwise envisioned herein. For example, method 200 may use system 100 described above, including oral care device 102 and computing device 110.

At step 202, a signal from optical sensor 112 is received by computing device 110. This signal may be received over a hard connection, or via a wireless connection.

At step 204, the location of light source 104 is determined from the received emitted light. As light source 104 is located near the tip of oral care device 102, the light source will project the light from within the user's mouth, and through the user's skin, when in use. Thus, the optical sensor 112 is configured to receive light emitted by light source 104 as it is transmitted from within the user's mouth and through the skin of the user's cheek. This step may include identifying a frequency or embedded code within the light so as to determine the received light is actually from light source 104 and not some other source.

At step 206, computing device 110 may process the signals received from optical sensor 112 so as to identify at least one feature of a user's face. This step may be accomplished by facial identification or tracking software as is known in the art. For example, the facial tracking software may identify a feature of the user's face, such as an outline of the user's face, the location of the user's eyes, lips, etc. At step 206, computing device 110 may process the signals received by optical sensor 112 so as to identify the location of light source 104 from the light emitted by light source 104.

At step 208, using the facial tracking software, the location of the user's oral cavity or teeth is estimated, relative to the identified facial feature. For example, computing device 110, using the facial tracking software, may identify at least one facial feature and use this feature to track the user's face. Based on known relations between facial features, such as lips, eyes, etc. the location of the user's teeth may be estimated.

At step 210, the location of the light source is compared with the estimated location of the teeth to determine the position of oral care device 102 with respect to the user's teeth. At step 212, from this determined position, the teeth being cleaned by the oral care device may also be determined (i.e. the oral care device is assumed to be cleaning the teeth it is closest to).

Figure 2B:
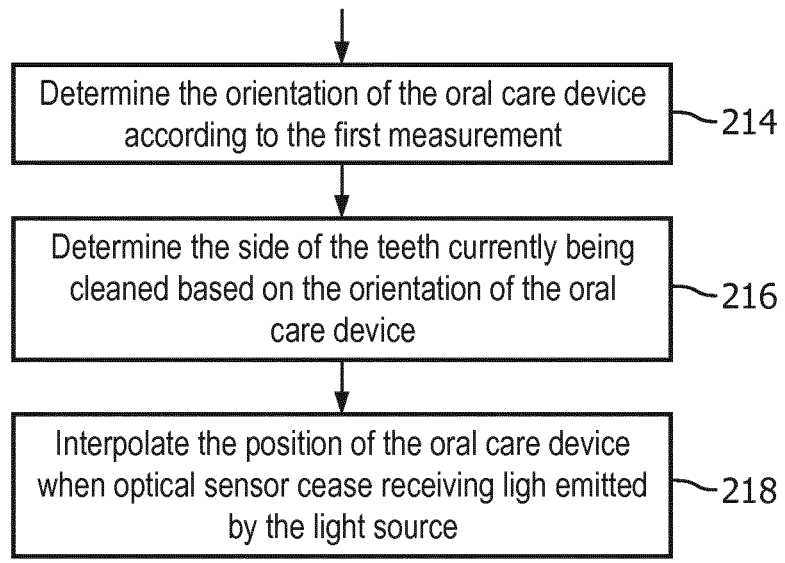
FIG. 2B is a flowchart of a method for tracking an oral care device in accordance with an embodiment.

As shown in FIG. 2B, at step 214, a measurement may be taken to determine the orientation of oral care device 102 within the user's mouth. For example, the intensity of the light emitted by light source 104 may be measured relative to a predetermined level or relative to a previously measured level, to determine whether light source 104 is pointing towards or away from optical sensor 112. For example, if the received light is diminished it may be assumed that oral care device is oriented away from optical sensor 112.

Alternately, computing device 110 may distinguish between the light received from two separate light sources 104, 106 pointing in different directions. For example, if the light source 103 is positioned on the back face of oral care device 102 and light source 106 is positioned on a side of oral care device 102, if the light emitted by light source 106 is stronger than the light emitted by light source 104, it may be assumed that the back of oral care device is facing away from optical sensor 112 while light source 106, i.e. the side of oral care device 102, is facing toward optical sensor. If the orientation, with respect to optical sensor 112 is known it may be assumed that a particular side of the teeth is being cleaned.

To distinguish between the lights received by light sources 104 and 106, (note that in alternate embodiments, more than two light sources may be used), and as discussed above, light source 104 may have one frequency or be embedded with one code, while light source 106 may have another frequency or be embedded with another code. Accordingly computing device 110 may differentiate between the light signals received by optical sensor 112, in order to determine the orientation of oral care device 102. In addition to light source 104, other sensors, such as an accelerometer or gyroscope may be used to determine the orientation of the brush within the user's mouth. Furthermore, another light source may be placed on the handle of the oral care device, which may be compared with the light received from within the user's cheek, to further determine the position or orientation of oral care device 102.

Figures 3A, 3B:
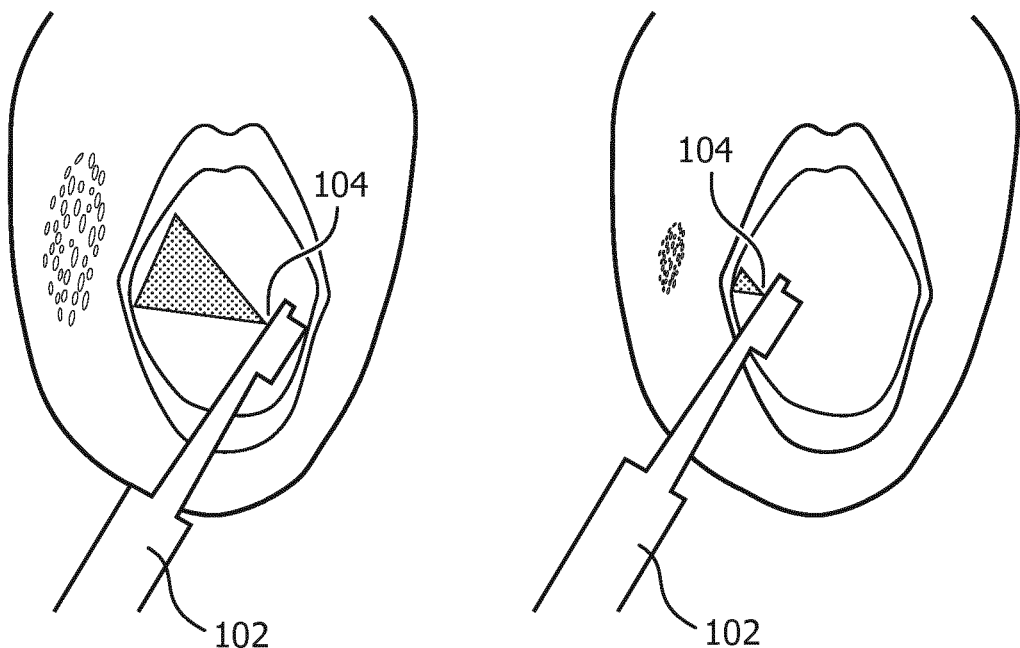
FIG. 3A is a perspective view of an oral care device projecting a pattern onto the cheek of a user.
FIG. 3B is a perspective view of an oral care device projecting a pattern onto the cheek of a user.

In an alternate embodiment, computing device 110 may determine the orientation or position of oral care device by measuring size of a pattern projected onto the interior of the cheek of a user by at least one light source (such as light source 104, although it may be any light-projecting element) and detected by optical sensor 112 through the cheek of the user. For example, two light sources arranged to emit light at a predetermined angle, may be used to project the pattern onto the cheek of the user. As shown in FIG. 3A, if oral care device 102 is far from the interior of the cheek of a user, the size of the pattern projected onto the cheek may be relatively large. However, as shown in FIG. 3B, as oral care device 102 is moved closer to the cheek of a user, the pattern may shrink. Computing device 110 may thus determine the position and orientation of oral care device 102 by measuring the size of the pattern relative to the face of the user, or relative to some other metric. For example, computing device 110 may receive from optical sensor 112 both the image of the user's face and the size of the pattern shining through the user's cheek. By comparing the size of the pattern to the size of the user's cheek, computing device 110 may determine that oral care device is positioned on the far side of the user's mouth (relative to the cheek being projected onto), and is oriented such that oral cleaning device is cleaning the interior of the user's teeth, as shown in FIG. 3A. Alternately, if the pattern is very small with respect to the user's cheek, computing device may determine that oral care device 102 is positioned on the near side of the user's mouth relative to the cheek being projected onto, and is cleaning the outside of the user's teeth. The pattern of light may be any detectable predetermined, random, or pseudo-random pattern. The pattern may be emitted by several light sources, or by a single light source.

Referring back to FIG. 2B, at step 216, according to the determined orientation of oral care device 102, the side of the teeth currently being cleaned may be identified. For example, if it is determined that oral care device 102 is oriented such that the back is facing the optical sensor 104, it may be determined the front of the user's teeth is currently being cleaned.

On occasion, light from each of the light sources 104, 106, etc., may completely disappear, or be severely diminished. When this occurs, it may be assumed that the tip of the oral care device is behind the user's teeth. To continue tracking the location of the tip, the position of the tip may be extrapolated from its last known point, or, to generate a history of the brush has been, a path traveled may be interpolated (at optional step 218) when the tip reappears from behind the teeth and light is once again received. By using the point that the tip was last viewed, and the point where it reappears, the path traveled by the brush may be estimated.

Tracking the location of oral care device 102 may be used in conjunction with an application, such as a mobile application, or on a display of general purpose computer or a smart mirror. The application may be used for informing a user which teeth have been cleaned, and which teeth still require cleaning. For example, the application may be display an abstract or 3D model teeth: clean teeth may be displayed as white, or having some other marker on them, while the teeth yet to be cleaned may be displayed as covered with virtual plaque, or have some other marker to identify them. The application may provide feedback on brushing time per location within the mouth, as it corresponds to individual teeth or teeth sections, as an indication of brush quality.

Alternatively, feedback may be given via a brush indicator light (which may or may not be the same as light source 104) which may indicate whether the user has spent enough time brushing a particular location (i.e. an amber light may indicate that not enough time has been spent at a location, while a green light may be indicate that the location is sufficiently cleaned). Indeed, any information, such as the movement speed of toothbrush 102, the force applied to toothbrush 102, etc. may be communicated by an indicator light by changing the frequency/color of the light. For example, computing device 110 may determine that the user is brushing too quickly, i.e. the position of toothbrush 102 is changing at a rate greater than a predetermined value. This may then be communicated back to toothbrush 102 via a microchip or other computing device located on toothbrush 102, and the color of the indicator light may be changed accordingly. Thus, if the user is brushing too quickly, indicator light may turn yellow, but may turn blue if the user is brushing at the proper speed. Alternately, a sensor 108 located on toothbrush 102 may calculate that too much force is being applied to toothbrush 102. The microchip located on toothbrush 102, or computing device 110, or a combination of computing devices acting in concert (including a microchip or computing device 110), may then instruct the indicator light to change colors to notify the user that too much force is being applied. It will be appreciated that any value, such as time spent at a position, force of brushing, or rate of brushing, may be calculated by computing device 110 or by a chip located on toothbrush 102 and communicated to the user by changing the color/frequency of one or more indicator lights located on toothbrush 102. In yet another embodiment, the microchip located on toothbrush 102 may communicate with computing device 110 via code embedded in the light emitted by the indicator light. For example, if a sensor 108 is reading that too much force is being applied, this may be communicated to computing device 110 by modulating the emitted light with a code that may be received by optical sensor 112 and interpreted by computing device 110. Computing device 110 may then notify user that too much force is being applied via an app on a mobile device or through a screen located on toothbrush 102 or by some other indicator. In this way any value detected by toothbrush 102, such as force applied, rate of brushing, etc., may be communicated to computing device 110. The value communicated to computing device 110 may be used to notify a user in real time whether the user is brushing properly, or may be stored and delivered to the user as a summary.

Optionally, a user or dentist may be able to enter where problem areas are that require specific brushing attention, which may be reflected in the amount of time that the application recommends a user spend on certain portion of teeth, or by otherwise notifying of their need to focus on that spot. The application may further store brushing behavior, as determined by the location of the oral care device, and bring it to the attention of a user or a dentist.

In addition, as computing device 110 tracks oral care device 102, computing device 110 may begin to form a model of the user's teeth. For example, if the user is missing molars, or wisdom teeth, computing device 110 recognize that oral care device 102 does not travel to these points in the mouth and may accordingly update or form a model of the user's teeth.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

What is claimed is:

1. A system for monitoring a location of an oral care device within a mouth of a user, comprising:
    an oral care device having a first light source;
    an optical sensor configured to receive light emitted by the first light source through a cheek of the user and to receive light reflected from a user using the oral care device;
    a computing device adapted to receive and process signals generated by the optical sensor, and programmed to:
        detect at least one facial feature of the user from the received light reflected from a user;
        estimate the location of the user's teeth according to the detected facial feature;
        determine a location of the first light source according to the received emitted light;
        compare the location of the first light source to the location of the teeth to estimate a position of the oral care device with respect to the teeth of the user.

2. The system of claim 1, further comprising a graphical interface programmed to display which teeth have been cleaned, based on a time spent by the oral care device at each point with respect to the user's teeth.

3. The system of claim 1, wherein the computing device is further programmed to:
    determine an orientation of the oral care device according to a measurement; and
    determine the side of the teeth currently being cleaned based on the orientation of the oral care device.

4. The system of claim 3, wherein the measurement is one of: a relative intensity of the received light emitted by the first light source, or a size of a pattern of the received light emitted by the first light source.

5. The system of claim 3, wherein the measurement is determined from a signal received from a sensor located within the oral care device, wherein the sensor is one of: a gyroscope, a magnetometer, or an accelerometer.

6. The system of claim 1, wherein the oral care device further includes a second light source, wherein the first light source emits light having a first characteristic in a first direction relative to the oral care device, and the second light source emits light having a second characteristic in a second direction relative to the oral care device.

7. The system of claim 6, wherein the computing device is further programmed to:
    determine an orientation of the oral care device by comparing an intensity of the light received from the first light source, and identified by the first characteristic, with an intensity of the light received from the second light source, and identified by the second characteristic; and determine the side of the teeth currently being cleaned based on the orientation of the oral care device.

8. The system of claim 6, wherein the first characteristic is a first frequency and the second characteristic is a second frequency.

9. The system of claim 6, wherein the first characteristic is a first embedded code the second characteristic is a second embedded code.

10. The system of claim 1, wherein the oral care device further comprises an indicator light source configured to emit light having at least a first characteristic, wherein a mode of light transmitted corresponds to a value of a measurement.

11. The system of claim 10, wherein the measurement is one of: a force applied to the oral care device, a movement speed of the oral care device, or a time spent by the oral care device at a position with respect to the user's teeth, wherein the characteristic is one of: a frequency, a color, or an embedded code.

12. The system of claim 1, wherein the computing device is further programmed to:
generate a model of the user's teeth according to a time spent at each position with respect to the user's teeth during at least one cleaning session.

13. The system of claim 1, wherein the computing device is further programmed to:
interpolate the position of the oral care device when optical sensor ceases receiving light emitted by the first light source.

* * * * *